US012768196B2

(12) United States Patent
Stendal et al.

(10) Patent No.: US 12,768,196 B2
(45) Date of Patent: Oct. 20, 2026

(54) LOCKING DEVICE WITH A CATCH FOR PREVENTING ROTATION OF A LATCH BOLT

(71) Applicant: STENDALS EL AB, Västerås (SE)

(72) Inventors: Jan Stendal, Västerås (SE); David Stendal, Bromma (SE); Björn Thorén Lindgren, Västerås (SE)

(73) Assignee: STENDALS EL AB, Västerås (SE)

( * ) Notice: Subject to any disclaimer, the term of this patent is extended or adjusted under 35 U.S.C. 154(b) by 132 days.

(21) Appl. No.: 18/711,171

(22) PCT Filed: Nov. 18, 2022

(86) PCT No.: PCT/SE2022/051081
§ 371 (c)(1),
(2) Date: May 17, 2024

(87) PCT Pub. No.: WO2023/091076
PCT Pub. Date: May 25, 2023

(65) Prior Publication Data

US 2025/0027335 A1 Jan. 23, 2025

(30) Foreign Application Priority Data

Nov. 19, 2021 (SE) .................................... 2151410-4

(51) Int. Cl.
*E05B 15/10* (2006.01)
*E05B 47/00* (2006.01)
(Continued)

(52) U.S. Cl.
CPC ........ *E05B 15/102* (2013.01); *E05B 47/0012* (2013.01); *E05B 47/06* (2013.01);
(Continued)

(58) Field of Classification Search
CPC ............... E05B 17/2007; E05B 17/203; E05B 17/2038; E05B 63/04; E05B 63/044;
(Continued)

(56) References Cited

U.S. PATENT DOCUMENTS 5,142,890 A 9/1992 Uyeda et al.
2006/0220391 A1* 10/2006 Baragano Gonzalez .................... E05B 55/12 292/194

(Continued)

FOREIGN PATENT DOCUMENTS

CN 111577021 A 8/2020
DE 10207630 A1 9/2003

(Continued)

*Primary Examiner* — Christine M Mills
*Assistant Examiner* — Peter H Watson
(74) *Attorney, Agent, or Firm* — Dilworth & Barrese, LLP

(57) ABSTRACT

The present invention relates to a locking device comprising an elongated face plate (30) for mounting on a door, the face plate comprising an opening (31) for a latch bolt, a latch bolt (10) having a bolt body (11) with a first end (11A) and a second end (11B), the bolt body (11) comprising a first surface (12) and a second surface (13) that are on opposite sides of the first end (11A), wherein the latch bolt (10) is configured to move from an extended position with the first end (11A) protruding from the opening (31) in the face plate (30) to a retracted position, and wherein the bolt body (11) is further configured to rotate around an axis that is parallel to the face plate (30) in response to a force applied to the first surface (12), and wherein further the second surface (13) is curved for sliding along an edge (33) of the opening (31) in the face plate (30) during rotation of the bolt body (11), (Continued)

Figure 2A:
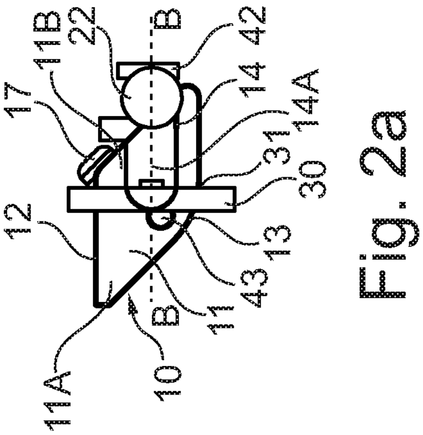

and the locking device (1) further comprising
a first blocking surface (14) on the second end (11B) of the latch bolt (10), and
a first catch (22) movable to a blocking position in which the first catch (22) engages the first blocking surface (14) for preventing the rotation of the bolt body (11).

19 Claims, 13 Drawing Sheets

(51) Int. Cl.

| | |
|---|---|
| ***E05B 47/06*** | (2006.01) |
| ***E05B 57/00*** | (2006.01) |
| ***E05B 63/04*** | (2006.01) |

(52) U.S. Cl.
CPC .......... *E05B 47/0607* (2013.01); *E05B 57/00* (2013.01); *E05B 63/044* (2013.01)

(58) Field of Classification Search
CPC ...... E05B 63/0056; E05B 63/08; E05B 47/06; E05B 47/0603; E05B 47/0607; E05B 65/0835; E05B 2015/105; E05B 57/00; E05B 15/102
See application file for complete search history.

(56) References Cited

U.S. PATENT DOCUMENTS

| | | | |
|---|---|---|---|
| 2008/0303290 | A1 | 12/2008 | Yuan |
| 2020/0291685 | A1 | 9/2020 | Arnold et al. |
| 2021/0293053 | A1 | 9/2021 | Bedford et al. |

FOREIGN PATENT DOCUMENTS

| | | | | | |
|---|---|---|---|---|---|
| DE | 102016101520 | A1 | | 8/2017 | |
| DE | 102020111229 | A1 | | 10/2021 | |
| EP | 1669524 | A1 | | 6/2006 | |
| EP | 2975202 | A1 | | 1/2016 | |
| WO | WO-2009096892 | A1 | * | 8/2009 | ......... E05B 65/1086 |
| WO | WO-2013112043 | A1 | * | 8/2013 | ......... E05B 47/0603 |

* cited by examiner

LOCKING DEVICE WITH A CATCH FOR PREVENTING ROTATION OF A LATCH BOLT

TECHNICAL FIELD

The present invention relates to a locking device having a latch bolt that is configured to rotate and also to be retracted from an extended position. The locking device also comprises a catch that is configured to block at least the rotation of the latch bolt.

BACKGROUND

Within the field of locking devices, latch bolts are generally movable between an extended position that corresponds to a closed or locked state and a retracted position that corresponds to an open or unlocked state. Some latch bolts are pivotable as well as retractable, and this has the advantage of enabling opening or closing of the door without having to operate a handle in order to retract the bolt. In a locked state, a catch is generally provided to prevent undesired movement of the latch bolt.

There are known problems associated with pivotable latch bolts. One is that large forces may be applied to the latch bolt in the locked state in situations where a person attempts to force the door open, causing possible breakage or malfunction of the catch, latch bolt or components such as bolt latches that support the latch bolt. For this reason such components must generally be made sturdy and strong, which in turn has the disadvantage that additional space inside the locking device is required to house them, as well as disadvantages associated with the cost of manufacture and handling.

Another problem is the need to comply with fire regulations by ensuring an open door can always be closed in an emergency. When the latch bolt is blocked so that pivoting and retraction is prevented, this generally also prevents the closing of an open door unless the lock itself is engaged by using the handle or an electromechanical actuation.

There is therefore a need for improvements within this field.

SUMMARY

The object of the present invention is to eliminate or at least to minimize the problems discussed above. This is achieved by a locking device according to the appended independent claim.

The locking device according to the present invention comprises

- an elongated face plate for mounting on a door, the face plate comprising an opening for a latch bolt,
- a latch bolt having a bolt body with a first end and a second end, the bolt body comprising a first surface and a second surface that are on opposite sides of the first end, wherein the latch bolt is configured to move from an extended position with the first end protruding from the opening in the face plate to a retracted position, and wherein the bolt body is further configured to rotate around an axis that is parallel to the face plate in response to a force applied to the first surface, and wherein further the second surface is curved for sliding along an edge of the opening in the face plate during rotation of the bolt body.

The locking device also comprises

- a first blocking surface on the second end of the latch bolt, and
- a first catch movable to a blocking position in which the first catch engages the first blocking surface for preventing the rotation of the bolt body.

By providing the catch to block the rotation in this way, undesired opening of the door is efficiently prevented. Also, the curved second surface sliding along the edge of the opening in the face plate causes the rotation to take place with only minor forces acting on other parts of the locking device besides the face plate. In the blocking position, forces act mainly on the face plate and the first catch so that additional components mounted in connection with the bolt body can be made smaller and thinner than in prior art locking devices. This is advantageous in allowing for more compact and cost efficient components to be used in the locking device and also significantly decreases the risk of damage or breakage to such components when a large force is applied to the first surface of the bolt body.

According to an aspect of the invention, the second end of the bolt body also comprises a second blocking surface, and the first catch is configured to engage also the second blocking surface in the blocking position for preventing a movement of the latch bolt to the retracted position. Thereby, both pivoting and retraction of the latch bolt are prevented by a single catch.

In some embodiments, the locking device further comprises a control arm for operating the latch bolt in a retraction direction and also comprises a retraction blocking surface arranged in connection with the bolt body or the control arm, and the locking device also comprises a second catch that is configured to engage the retraction blocking surface for preventing movement of the latch bolt to the retracted position. Thereby, separate catches are provided for blocking the pivoting and the retraction of the latch bolt and this has the advantage of being able to operate them independently for preventing one of these movements but allowing the other. In situations where it must always be possible to close the door, the pivoting may then be blocked in order to prevent opening of the door after closure, whereas allowing the retraction enables closure of the door regardless of the state of the electromechanical actuator or of the mechanical handle provided in connection with the locking device.

Suitably, the first catch is substantially spherical. Thereby, moving the catch to and from the blocking position is rendered quick and efficient, and any unauthorized manipulation of the lock by applying force to the locking bolt is largely prevented.

The first blocking surface and optionally also the second blocking surface suitably has/have a height that is less than half a diameter of a tapering lower part of the first catch. Thereby, the first catch is pushed from the blocking surface(s) when not blocked into place so that rotation of the latch bolt is enabled without requiring a separate step of moving the first catch away from the blocking surface(s).

Suitably, the locking device further comprises a control mechanism for preventing movement of the first catch out of the blocking position in an engaged state. Thereby, the catch can be held securely in the blocking position so that rotation and optionally also retraction of the latch bolt is prevented.

Also, the blocking position of the first catch is suitably a position in which the first catch is held in a center position of the second end of the latch bolt. Thereby, in embodiments where the latch bolt is rotatable to a second position the catch is able to operate without requiring additional modifications to the locking device apart from the rotation of the latch bolt itself.

Suitably, the first blocking surface and optionally also the second blocking surface is/are on an upper part of the latch bolt so that a movement of the first catch to the blocking position is a movement directed at least partially downwards. Thereby, the catch is able to move into the blocking position due to gravity and falling out of the blocking position is prevented once the position is reached.

In embodiments where the latch bolt is rotatable, the latch bolt suitably also comprises a third blocking surface and optionally a fourth blocking surface on a lower part, said third blocking surface being configured to prevent a rotation of the latch bolt and said optional fourth blocking surface being configured to prevent a movement of the latch bolt to the retracted position when cooperating with a first catch in a blocking position. Thereby, the same blocking functions may be achieved when the latch bolt is rotated so that the lower part faces upwards.

Suitably, the locking device also comprises a protruding element removably fastened to the bolt body between the first end and the second end and adjacent to the face plate in the extended position, wherein the protruding element is configured to cooperate with the face plate to form a fulcrum for rotating the bolt body in a first rotational direction in response to a force applied to the first end. Thereby, the rotation of the bolt body can take place in an efficient and convenient way.

In some embodiments, the protruding element is fixedly attached to or integrally formed with the latch bolt. This facilitates manufacture of the latch bolt and allows for a very sturdy and reliable component that has a long lifetime.

Also, the locking device suitably comprises a housing for holding the latch bolt, wherein the housing comprises a first access opening for providing access to the protruding element when the latch bolt is in the extended position such that the protruding element can be removed from the locking device through the first access opening. Thereby, the latch bolt can be removed through the opening in the face plate without requiring opening of the housing itself. This in turn allows for an easy realignment of the latch bolt in a rotated position so that the locking device can be adjusted to fit both doors that open to the left hand side and doors that open to the right hand side. It is advantageous to be able to make this adjustment in an easy and time efficient way without requiring opening the locking device itself, so that the risk of damage or misalignment to other components inside the locking device may also be minimized.

In embodiments where the housing is provided with at least one access opening for removing the protruding element, the protruding element may be a screw with an outer thread. Also, the protruding element may then be removably fastened to the bolt body by the screw being screwed into a hole with an inner thread in the bolt body. This is a secure and stable fastening of the protruding element but still allows easy removal if desired. The risk of malfunction due to the protruding element moving in relation to the bolt body is also minimized.

In other embodiments where the housing is provided with at least one access opening for removing the protruding element, the protruding element may instead be a pin. The protruding element is then removably fastened to the bolt body by the pin being inserted into a corresponding opening in the bolt body. This allows for easy and convenient removal of the protruding element as desired, and is also allows for convenient and efficient manufacture of the latch bolt.

In embodiments where the access opening is provided in the housing, the opening in the face plate is suitably dimensioned to allow extraction of the bolt body through the opening when the protruding element is removed. Thereby, the removal and rotation of the bolt body is further facilitated.

Also, the protruding element may be configured to cooperate with the face plate by the protruding element contacting the face plate, optionally with at least one intermediate element between the protruding element and the face plate. Thereby, the protruding element is able to create a fulcrum in an advantageous way so that rotation of the bolt body may take place as desired.

Also, the housing suitably comprises a second access opening on an opposite side to the first access opening for providing access to an opposite side of the latch bolt. Thereby, the bolt body may be mounted in an easy and convenient way after rotation.

Suitably, the locking device also comprises a control arm for operating the latch bolt in a retraction direction and extension direction, and the control arm is removably engaged to the latch bolt. Thereby, the movement of the latch bolt is controlled in an efficient way so that retraction and extension of the latch bolt can take place.

In some embodiments, the control arm may instead be integrated with or fixedly attached to the bolt body to render their connection more stable.

Suitably, the control arm is pivotably mounted on the latch bolt. Thereby, the pivoting of the bolt body may take place without affecting the control arm itself.

Also, the locking device may further comprise a non-mechanical mechanism for operating the locking device in response to a non-mechanical activation, and the non-mechanical mechanism may be operatively connected to the first catch and optionally also to the second catch. Thereby, both rotation and retraction of the latch bolt may be enabled through the non-mechanical activation.

Many additional benefits and advantages of the present invention will be readily understood by the skilled person in view of the detailed description below.

DRAWINGS

Figure 1B:
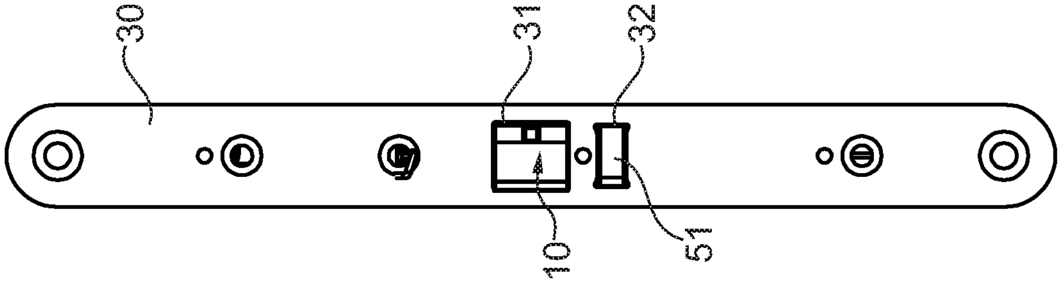
Figure 1A:
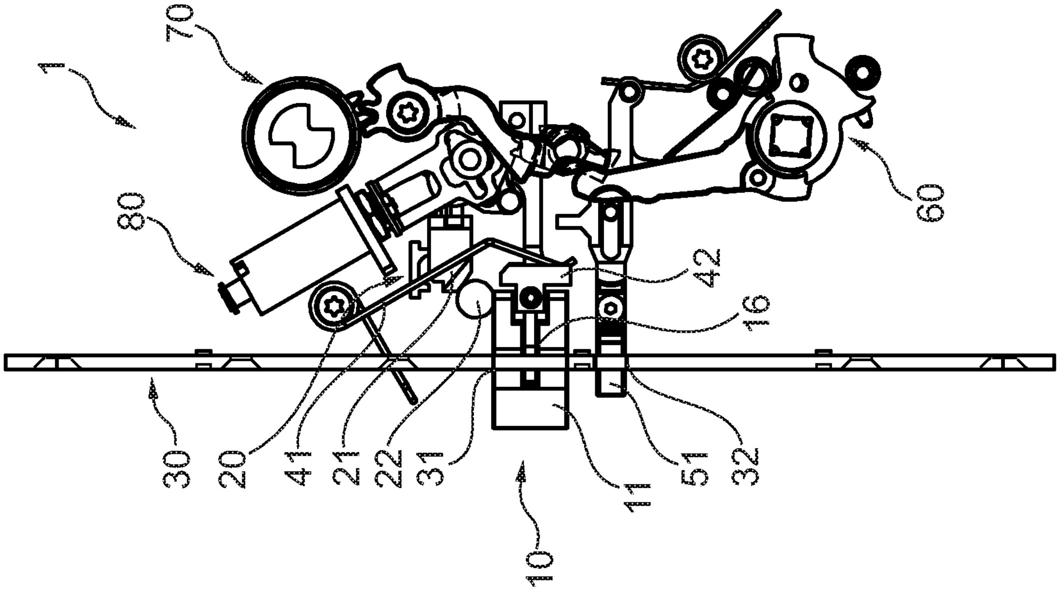
Figure 2C:
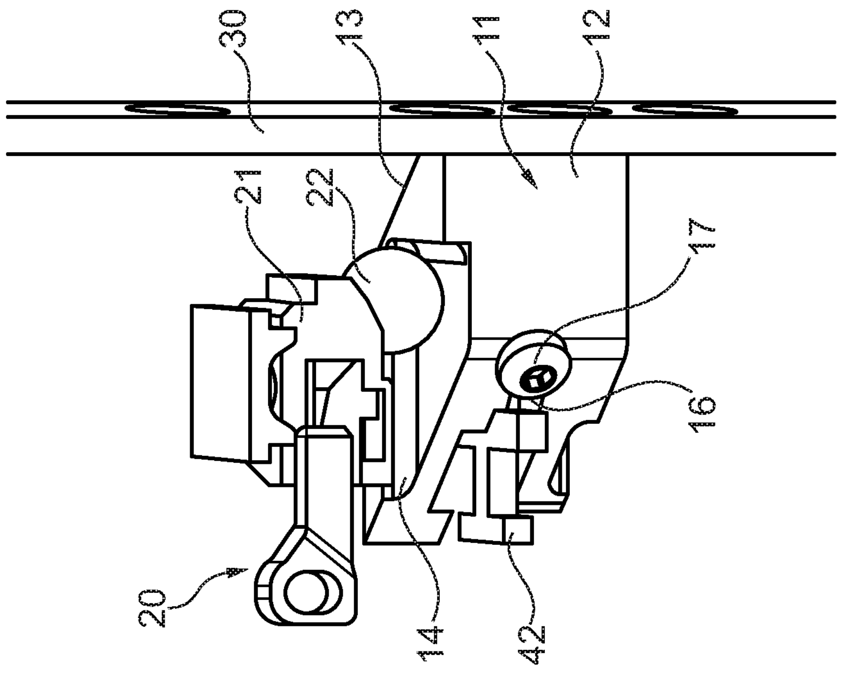
Figure 2B:
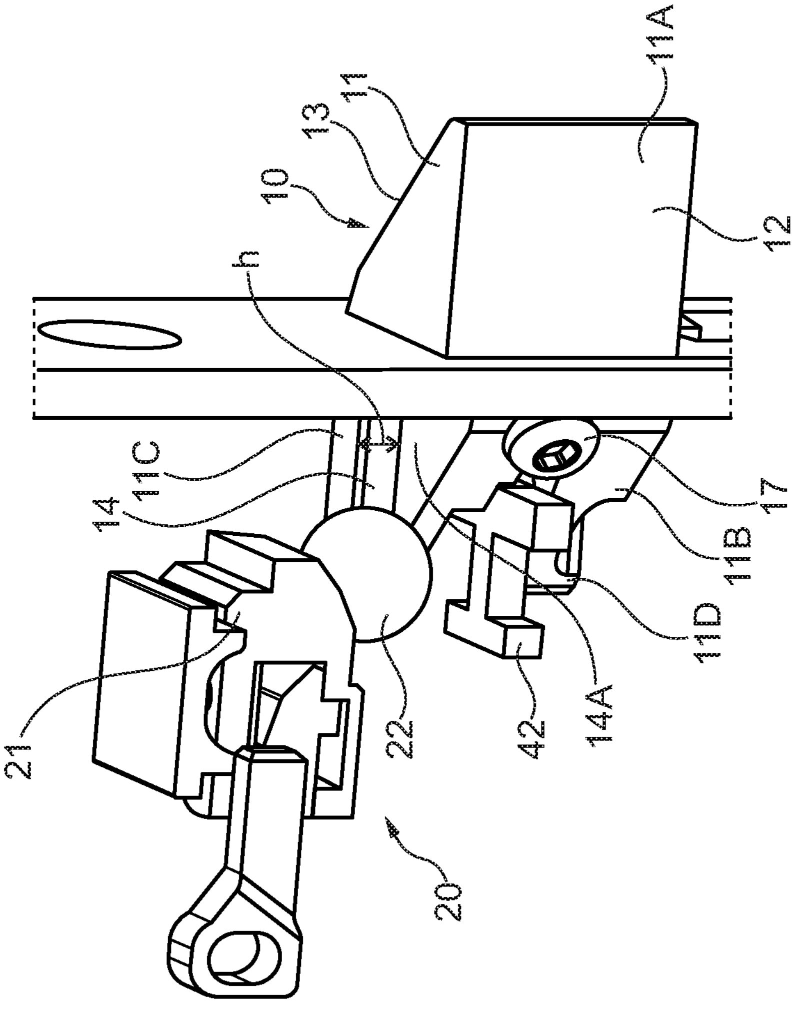
Figure 3A:
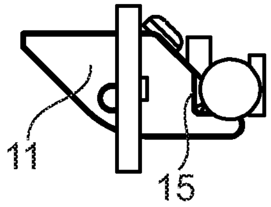
Figure 3B:
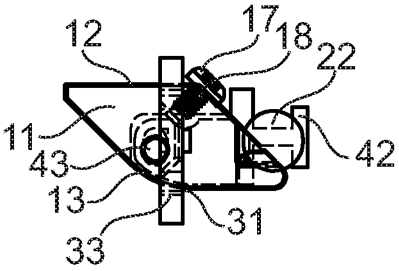
Figure 3C:
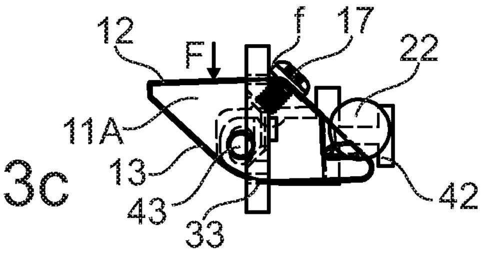
Figure 3D:
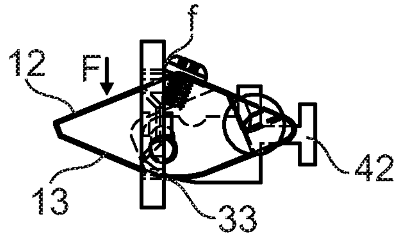
Figure 3E:
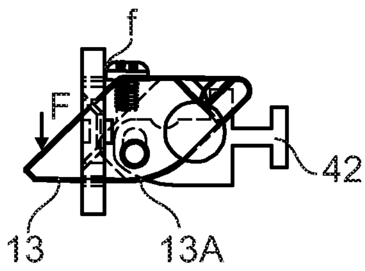
Figure 4B:
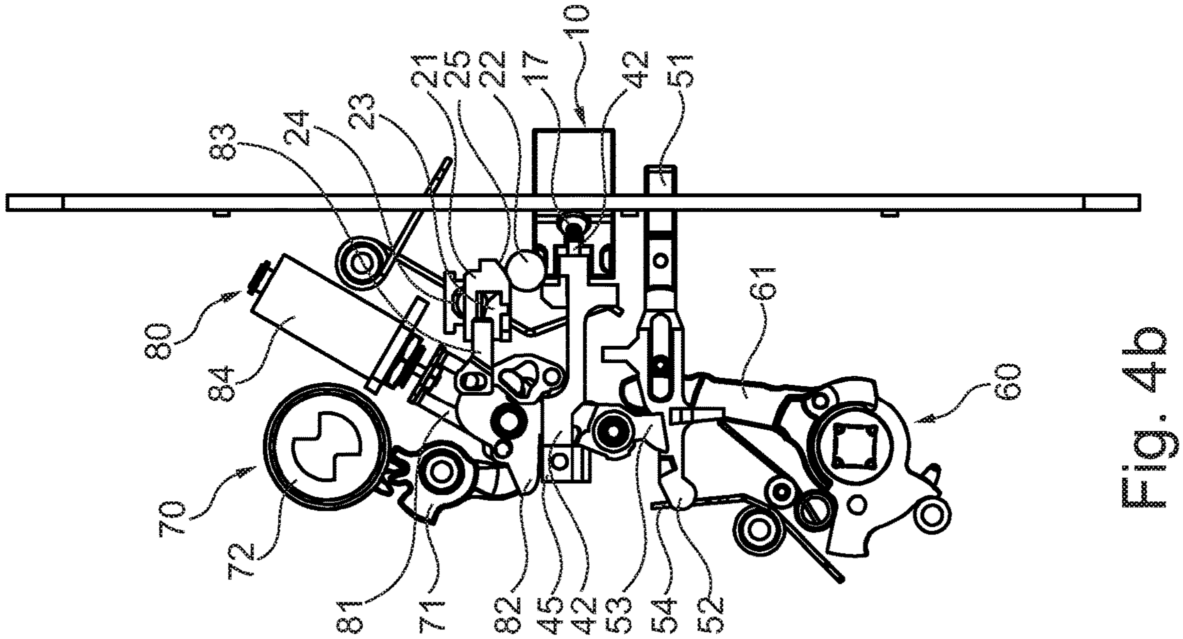
Figure 4A:
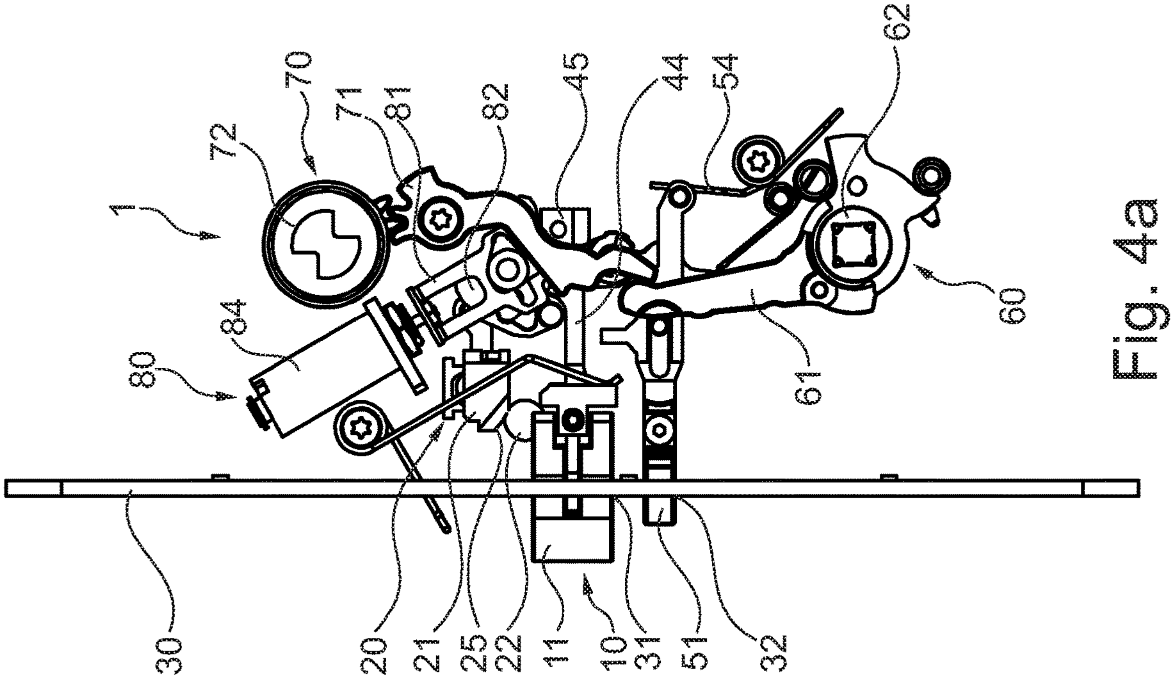
Figure 4D:
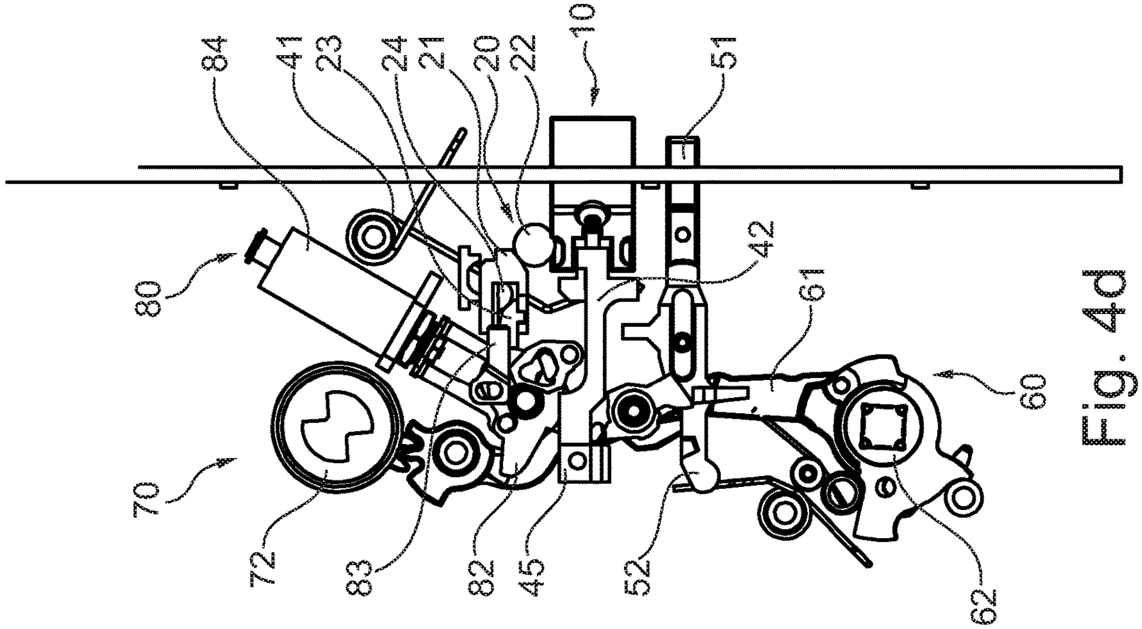
Figure 4C:
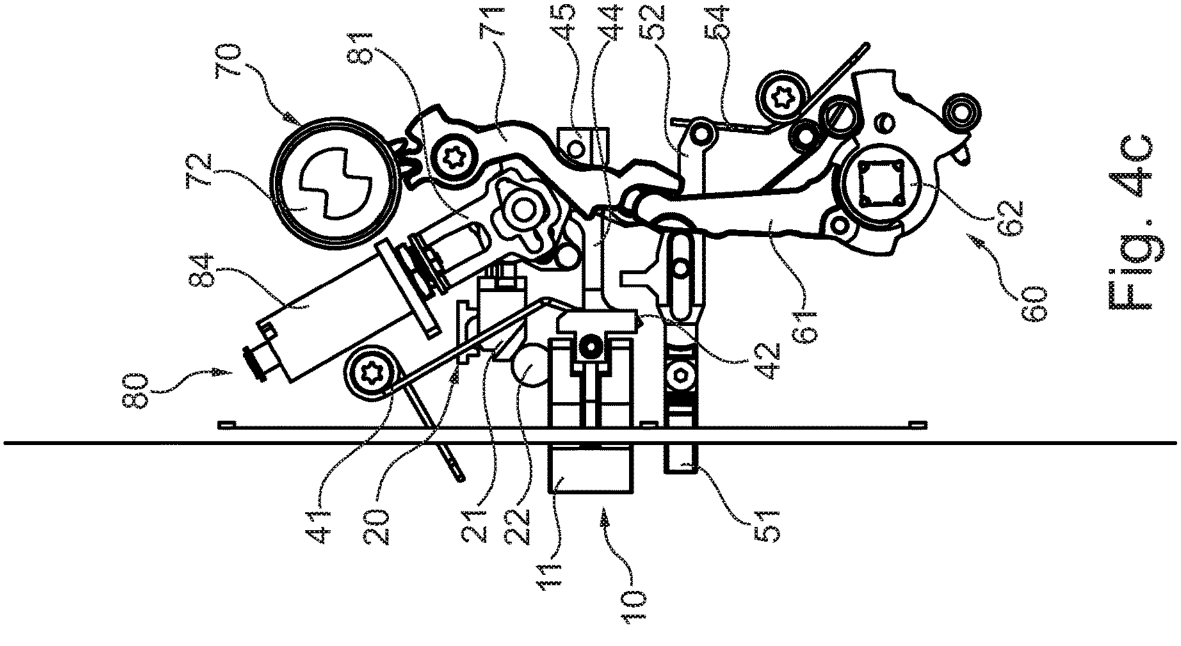
Figure 5B:
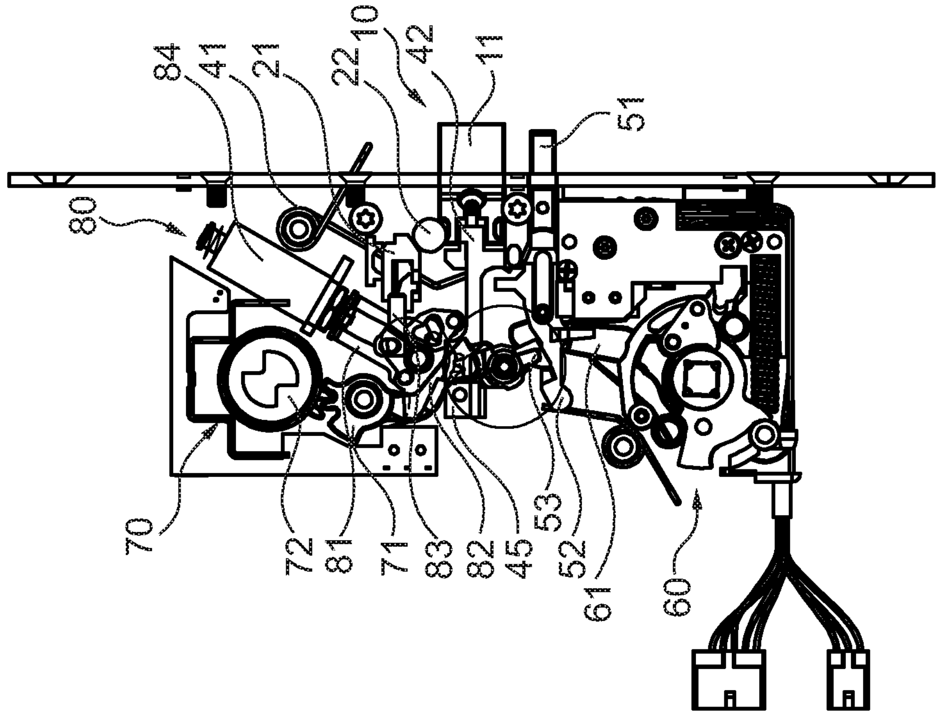
Figure 5A:
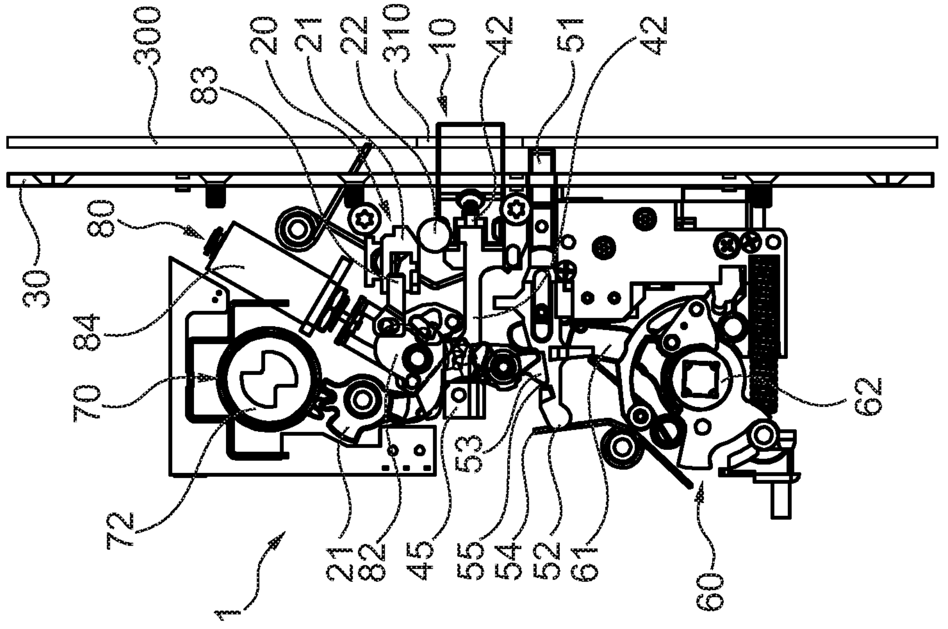
Figure 5D:
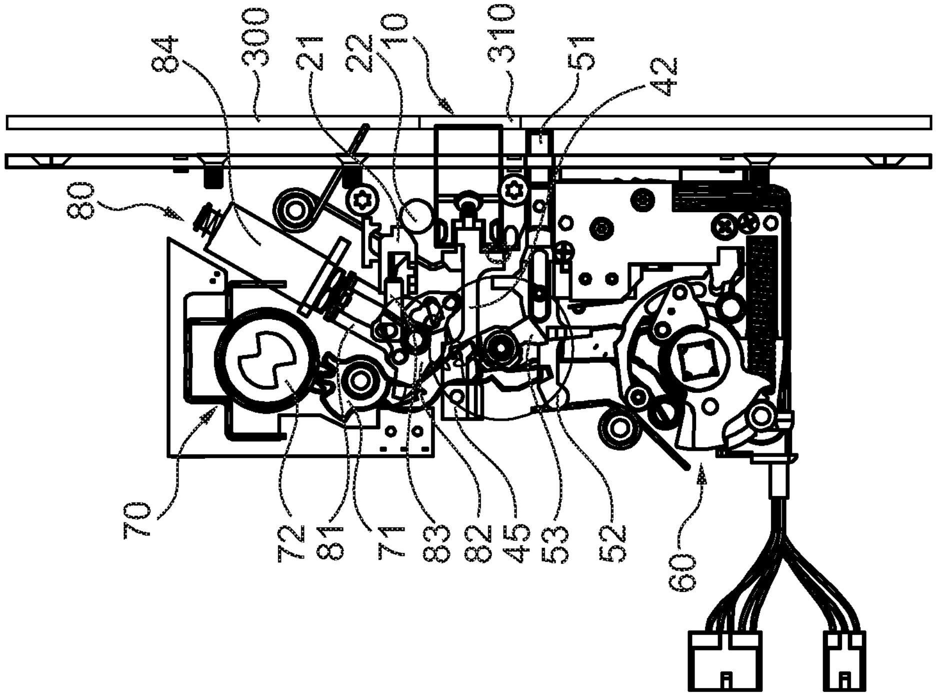
Figure 5C:
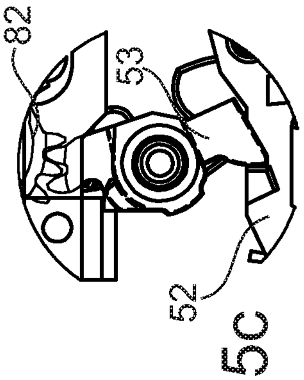

The invention will now be described in more detail with reference to the appended drawings, wherein FIG. 1*a* discloses the locking device according to a first embodiment of the present invention in a view from a first side;

FIG. 1*b* discloses the locking device of FIG. 1*a* in a view from a second side that is perpendicular to the first side;

FIG. 2*a* discloses a bolt body and face plate of the locking device according to the first embodiment in a view from above;

FIG. 2*b* discloses the bolt body and other parts of the locking device of the first embodiment in a perspective view from a third side that is opposite to the first side;

FIG. 2*c* discloses the components of FIG. 2*b* in a retracted position;

FIG. 3*a* discloses a bolt body and face plate of the locking device according to a second embodiment of the invention in a view from above;

FIG. 3*b* discloses the components of FIG. 3*a* in a transparent view;

FIG. 3*c* discloses the components of FIG. 3*b* in a position of a first stage of rotation;

FIG. 3*d* discloses the components of FIG. 3*b* in a position of a second stage of rotation;

FIG. 3*e* discloses the components of FIG. 3*b* in a fully rotated position;

FIG. 4*a* discloses the locking device according to a third embodiment with the locking device in a blocked state in a planar view from the first side;

FIG. 4*b* discloses the locking device of FIG. 4*a* in a blocked state in a planar view from the second side;

FIG. 4*c* discloses the locking device of FIG. 4*a* with the locking device in a non-blocked state in a planar view from the first side;

FIG. 4*d* discloses the locking device of FIG. 4*c* in a planar view from the second side;

FIG. 5*a* discloses the locking device according to a fourth embodiment in a planar view from the second side, with the locking device in a closed position with the latch bolt protruding into a strike plate;

FIG. 5*b* discloses the locking device of FIG. 5*a* in an open position;

FIG. 5*c* discloses an enlarged view of part of FIG. 5*b;*

Figure 5E:
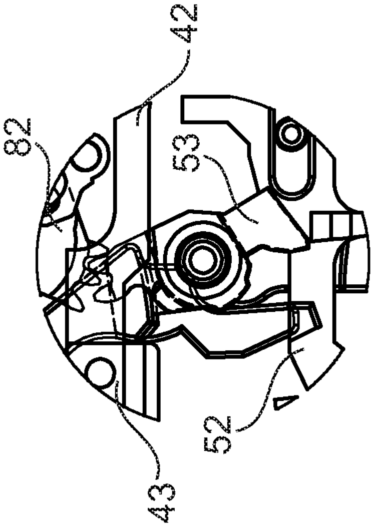

FIG. 5*d* discloses the locking device of FIG. 5*a* with the first catch in the non-blocked position;

FIG. 5*e* discloses an enlarged view of part of FIG. 5*d;*

Figure 6B:
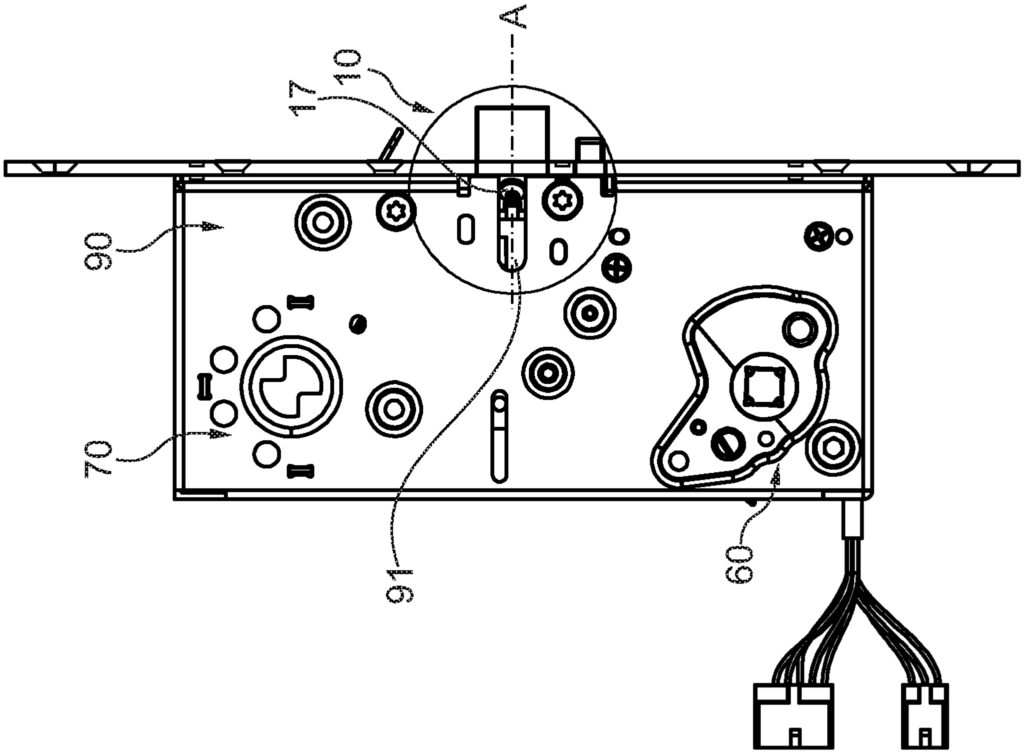
Figure 6A:
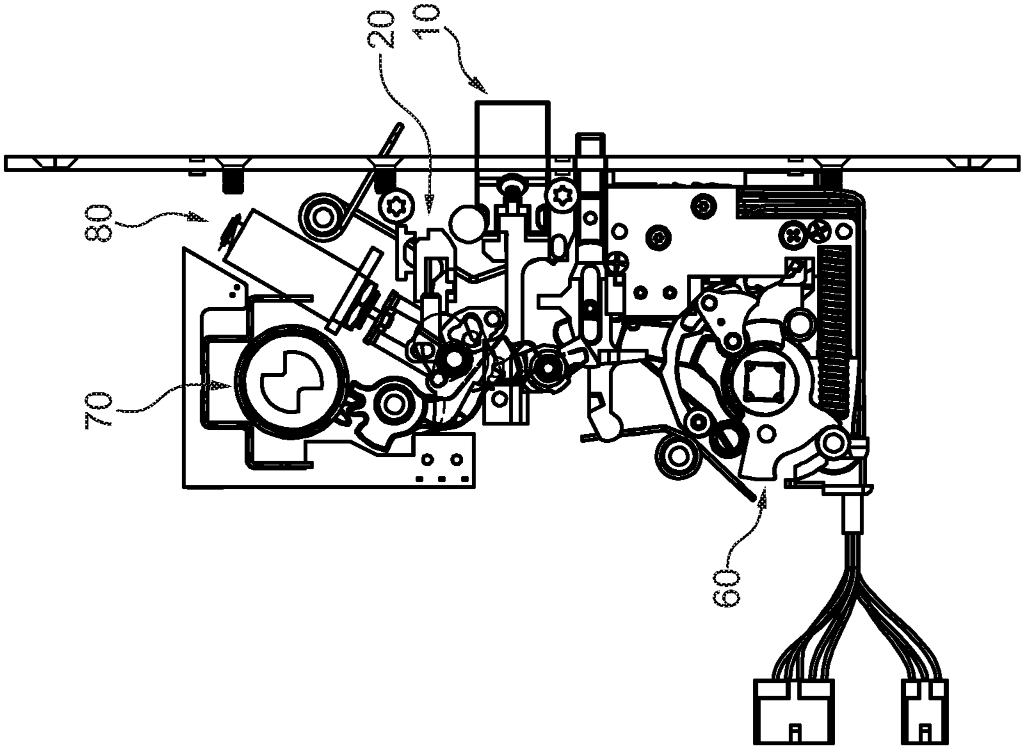
Figure 6C:
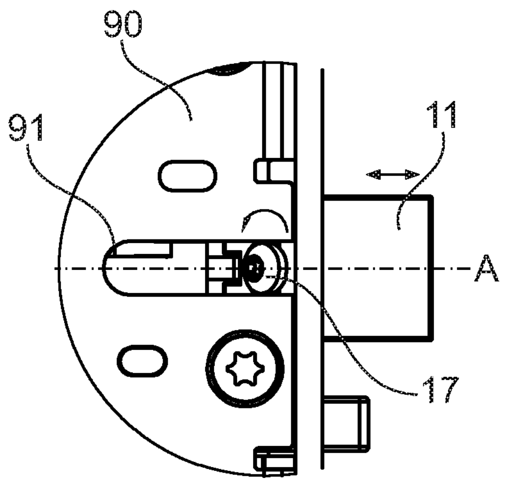

FIG. 6*a* discloses the locking device according to the invention in a planar view from the second side;

FIG. 6*b* discloses the locking device of FIG. 6*a* showing a housing enclosing components of the locking device;

FIG. 6*c* discloses an enlarged view of the circle of FIG. 6*b;*

Figure 6D:
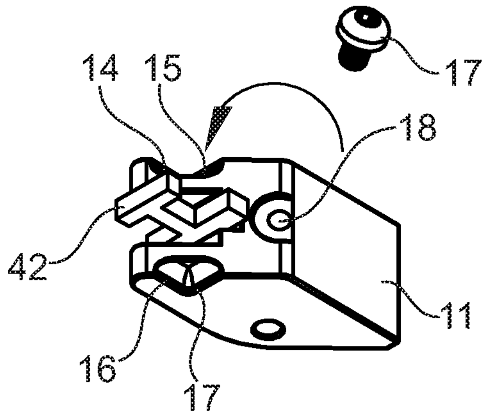

FIG. 6*d* discloses the bolt body of the locking device of FIG. 6*a;*

Figure 7B:
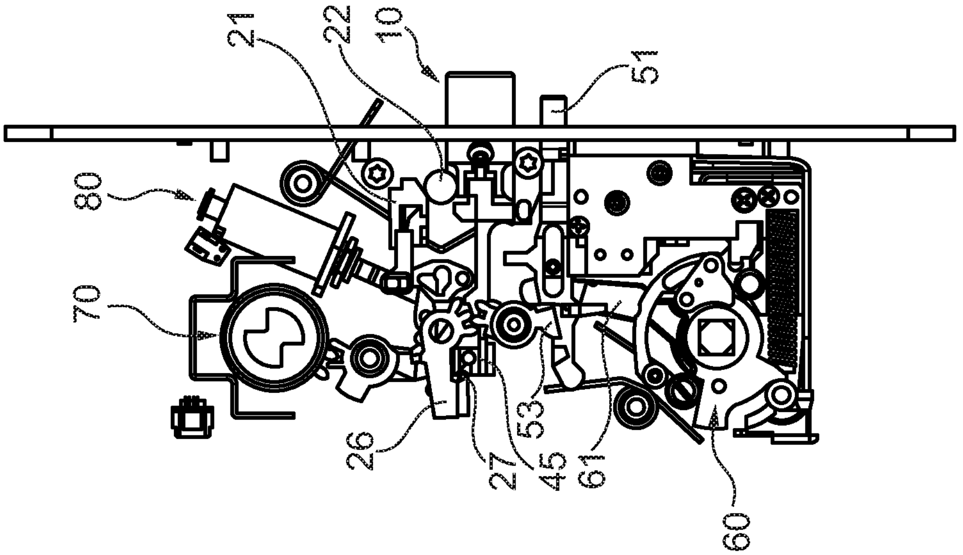
Figure 7A:
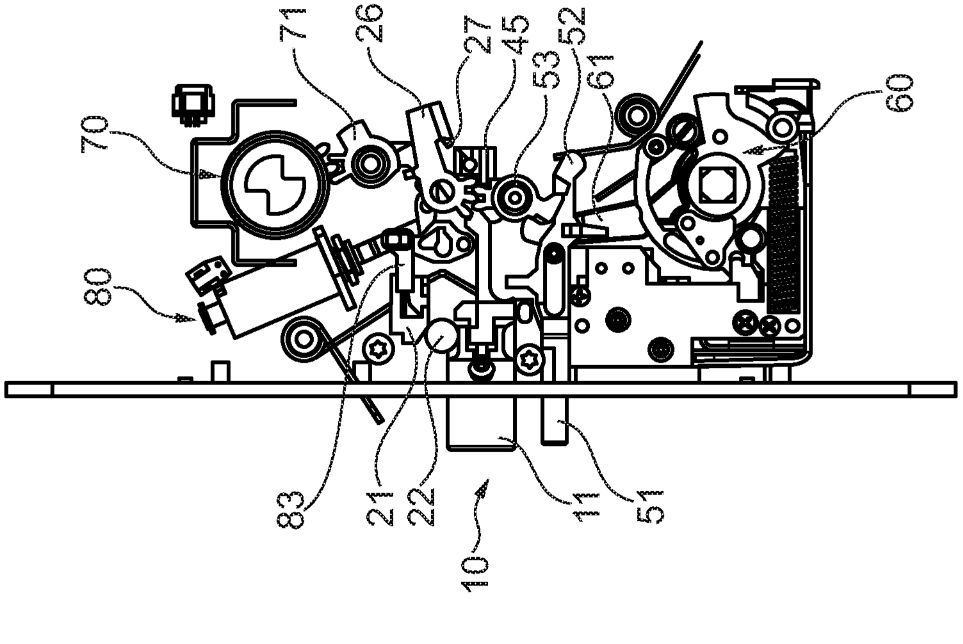
Figure 7C:
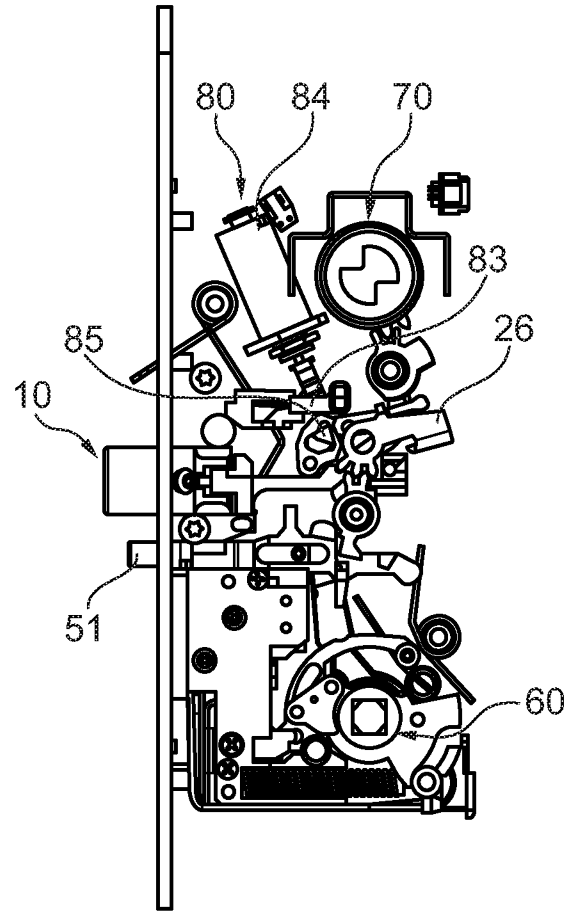
Figure 8:
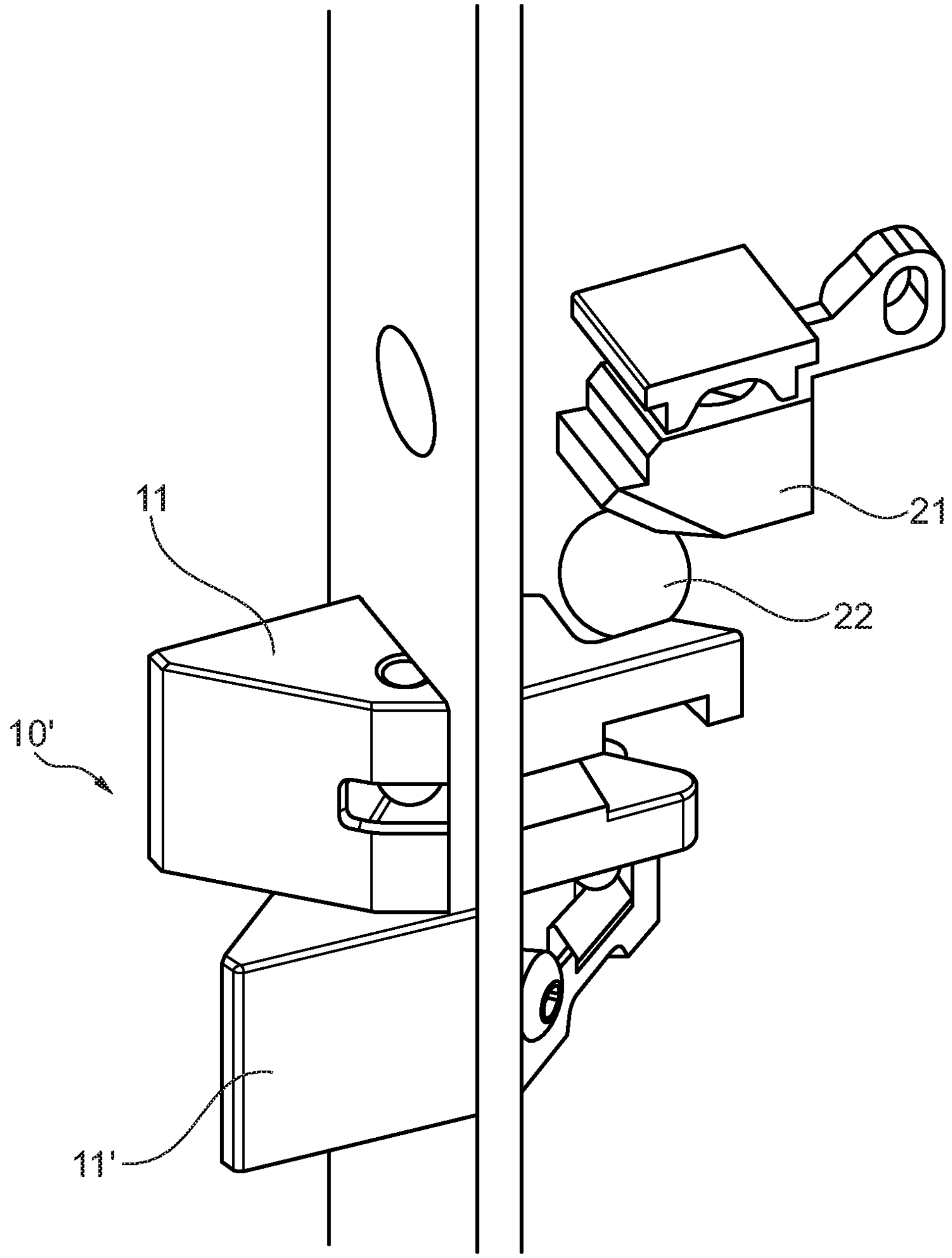
Figure 9:
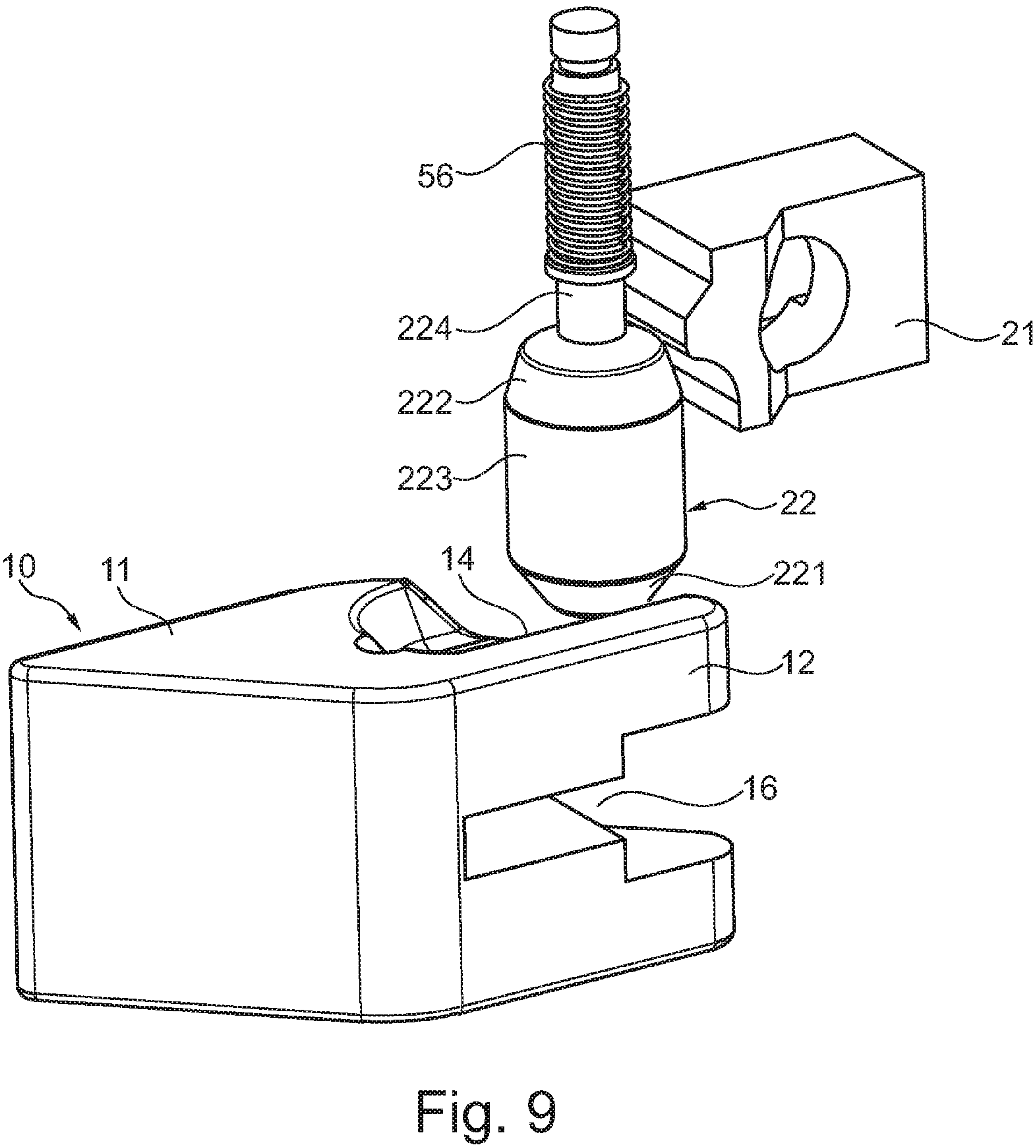

FIG. 7*a* discloses a fifth embodiment of the locking device according to the invention in a planar view from the first side, with the locking device in the open position;

FIG. 7*b* discloses the locking device of FIG. 7*a* in a non-blocking position, showing a perspective view from the second side;

FIG. 7*c* discloses the locking device of FIG. 7*a* with both the first catch and the second catch in the non-blocking positions;

FIG. 8 discloses a sixth embodiment of the locking device in a perspective view; and FIG. 9 discloses a seventh embodiment of the locking device in a perspective view.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

In the following, the locking device according to various embodiments of the present invention will be described in detail. In order to facilitate understanding of the key features of the invention, FIG. 1-4 disclose the basic operating principle of the invention and in particular the interaction of the bolt body, the face plate and the first catch in the blocked position where rotation is prevented as well as the interaction of the bolt body and the face plate during rotation of the bolt body when the first catch is not in the blocking position. Then, FIG. 5 onwards will be described to disclose the components and operation of the locking device as a whole as well as further embodiments of the invention. It is to be noted that features of the various embodiments may freely be combined with each other unless such a combination is explicitly stated as undesirable. Also, for some embodiments only those features that differ from other embodiments are described, so that any components not described can be assumed to be similar or identical to such components of any of the other embodiments.

The term "operatively connected" when used herein is to be understood as one component being connected to another component in such a way that a force or movement can be transferred from one component to the other. This may mean that a first component is configured to contact a second component directly or that there is at least one intermediate component between them that transfers the force or movement from the first component to the second. When it is stated that the non-mechanical mechanism is operatively connected to a part or mechanism of the locking device, this is to be understood as the non-mechanical mechanism being able to cause a movement or force to be transferred to that part or mechanism for operating (i.e. moving) at least one part of the locking device.

The non-mechanical mechanism may typically be an electrical motor, a solenoid or another type of non-mechanical unit such as an electronic device that may be a micro switch or other actuator that is able to cause an activation in a locking device. Any kind of non-mechanical mechanism is suitable for use with the present invention as long as it is able to operate the control mechanism as described herein. Suitably, the non-mechanical mechanism comprises an electrical activation using an electrical motor or a magnetic activation using a solenoid.

FIG. 1*a* discloses a locking device 1 according to the first embodiment of the present invention, with an elongated face plate 30 for mounting in a door and with a latch bolt 10 extending through an opening 31 in the face plate 30. Additional openings 32 may also be provided to allow extension of other bolts, such as an optional auxiliary bolt 51 shown in FIG. 1*a*. The latch bolt 10, the auxiliary bolt 51 and any other bolts provided in the locking device 1 are operated by manual and/or electromagnetic means such as a handle connected to a handle mechanism 60, a cylinder mechanism 70 operated by a key or similar, and a non-mechanical mechanism 80 that may be operated by an electrical motor, a solenoid or similar. These mechanisms 60, 70, 80 will be described in detail further below with reference to FIG. 5 onwards; suffice it to say at present that they may operate a control arm 42 connected to the latch bolt 10 in a receiving groove 16 for retracting the latch bolt 10 from an extended position and that they may also operate a control mechanism 20 for controlling at least a first catch 22 but optionally also a second catch (see FIG. 7*a*-7*c*). Also provided in the locking device 1 is a biasing device 41 that is suitably in the form of a spring and that acts on the latch bolt 10 directly or on a component connected to the latch bolt 10 for urging the latch bolt towards the extended position shown in FIG. 1*a*. In some embodiments, the control arm 42 is integrated with the bolt body 11 but in other embodiments the control arm 42 is a separate component.

The latch bolt 10 is configured to move in a linear movement from the extended position to the retracted position. A bolt body 11 of the latch bolt 10 is configured to collapse, i.e. to rotate about an axis that is vertical when the locking device is mounted in a door, i.e. an axis that is parallel to or coinciding with the faceplate 30.

FIG. 2*a* discloses the latch bolt 10 extending through the opening 31 in the faceplate 30, and shows the latch bolt 10 comprising the bolt body 11 with a first surface 12 and a second surface 13 that are opposite each other and arranged on a first end 11A of the bolt body that protrudes from the locking device 1 through the faceplate 30. A second end 11B of the bolt body 11 is held inside the locking device 1 and comprises a first blocking surface 14 that is engaged by the first catch 22 in a blocking position such that the first catch 22 prevents rotation of the bolt body 11. In the first embodiment, the bolt body 11 comprises a catch groove 14A so that the bolt body 11 can be retracted into the locking device 1 in a linear movement without being hindered by the first catch 22 in the blocking position. In this retraction, the first catch 22 is configured to slide along the catch groove 14A and continue to contact the first blocking surface 14 so that rotation of the bolt body 11 is prevented. It is advantageous that the catch groove 14A does not extend beyond the faceplate 30 in the extended position, to ensure that the catch groove 14A is not available from outside the locking device 1. This is particularly advantageous in preventing manipulation where an unauthorized person could insert an object into the catch groove 14A to prevent retraction of the bolt body 11 into the locking device 1. It is also advantageous in preventing wear and decreased performance of the locking device 1 caused by dirt entering the catch groove 14A. In some embodiments, it may also be advantageous to move the first catch 22 out of the catch groove 14A before or during retraction of the bolt body 11 to prevent the first catch 22 from contacting an end of the catch groove 14A at the first end 11A of the bolt body. In other embodiments, the catch groove 14A is instead long enough to enable retraction of the bolt body 11 to the retracted position without the first catch 22 hindering such movement.

FIG. 2*b* discloses the bolt body 11 with the first catch 22 held in the blocking position against the first blocking surface 14 by a control member 21 of a control mechanism 20. Also shown in FIG. 2*b* is the receiving groove 16 in the bolt body where the control arm 42 is inserted to operate the bolt body 11 for retracting it from the extended position, as well as a pivoting element 17 that extends from the bolt body 11 inside the locking device 1 and adjacent to the faceplate 30 and that is configured to guide the bolt body 11 in its rotation as will be described below with reference to FIG. 4*a*-4*d*.

FIG. 2*c* discloses the components of FIG. 2*b* in the retracted position where the bolt body 11 is retracted by the control arm 42 in response to a mechanical or non-mechanical activation in the locking device 1 as will be described in more detail below. In the retracted position, the first catch 22 is still held in the blocking position by the control member 21 of the control mechanism 20 and thus still prevents rotation of the bolt body 11 by the first catch 22 contacting the first blocking surface 14.

The first catch 22 is shown in the first and second embodiments, and also in other embodiments of the invention, in the form of a spherical or substantially spherical object such as a ball. This is advantageous in allowing easy manipulation of the first catch 22 into and out of the blocking position. In some embodiments, the first catch 22 may instead be oval or have any other shape that is suitable for moving into a blocking position and contacting the first blocking surface 14 for preventing rotation of the bolt body 11. Such a shape may be an arm, a pin, or any other mechanical form that is suitable for blocking a movement. The term substantially spherical is to be understood herein as meaning that the catch is spherical within manufacturing tolerances. Below, another embodiment with a first catch 22 of another shape is disclosed with reference to FIG. 9. Where the first catch 22 is spherical, the first catch 22 comprises a tapering lower part that extends from half a height of the first catch 22 and downwards.

It is particularly advantageous in embodiments where the first catch 22 is a ball or has an oval shape that the first blocking surface 14 (and optionally also a second blocking surface 15 as described below with reference to the second embodiment) has a height h that is less than half a diameter of the first catch 22. Alternatively, the first catch 22 has a tapering lower part 221 to achieve the same advantage. In this way, the first catch 22 is easily pushed out of the way by a rotation of the bolt body 11 when the control member 21 does not actively hold the first catch 22 in the blocking position. It is also advantageous that the blocking position is provided on an upper side 11C of the bolt body 11 so that the first catch 22 enters the blocking position by gravity acting on the first catch 22 when the bolt body 11 is not rotated in relation to the faceplate 30. This ensures that the first catch 22 is always in place and ready to be fixed by the control member 21, causing operation of the first catch 22 to be convenient and reliable.

In other embodiments, however, the first blocking surface 14 and optionally also the second blocking surface 15 may instead have other dimensions and may be provided with beveled portions to allow the first catch 22 to be pushed out of the blocking position when not held in place by the control member 21. Also, in some embodiments the control mechanism 20 may instead move the first catch 22 into and out of the blocking position so that any shape and dimension of the first blocking surface 14 and optionally the second blocking surface 15 are possible.

FIG. 3*a*-3*e* disclose a second embodiment of the bolt body 11 where a second blocking surface 15 is provided so that the first catch 22 in the blocking position is able to block both the rotation of the bolt body 11 and the retraction into the locking device 1. Suitably, the first blocking surface extends away from the faceplate 30 similar to the first embodiment so that the presence of the first catch 22 causes the rotation of the bolt body 11 to be prevented. The second blocking surface 15 suitably extends substantially parallel to the faceplate 30 in the extended position so that the first catch 22 is able to block the retraction of the bolt body 11 without causing any pivoting movement of the bolt body 11 itself. In FIG. 3*a*, the first catch 22 is held in the blocking position so that rotation and retraction of the bolt body 11 is blocked.

The rotation of the bolt body 11 when the first catch 22 is not held in the blocking position by the control member 21 will now be described with reference to FIG. 3*b*-3*c*.

In FIG. 3*b*, the bolt body 11 is shown in a transparent view, showing the control arm 42 mounted on a pin 43 that may be integrated with the bolt body 11 or with the control arm 42 so that the bolt body 11 is able to pivot in relation to the control arm 42. Also shown in FIG. 3*b* is the protruding element 17 that in the first and second embodiments is in the form of a screw inserted into a threaded opening 18 in the bolt body 11.

The bolt body 11 in FIG. 3*b* is held in the extended position and it is to be noted in particular that the second surface 13 is a curved surface that fits against the opening 31 in the faceplate 30.

When the locking device 1 is mounted in a door and the latch bolt 10 is in the extended position, the first end 11A of the bolt body 11 typically protrudes into a strike plate (not shown) mounted in a door frame. When the bolt body 11 is not blocked by the first catch 22, the door can be closed by releasing the door from an open position or pushing it towards the closed position so that the strike plate contacts the first end 11A of the bolt body 11 and a force F is applied to the first surface 12 of the bolt body 11. This situation is shown in FIG. 3*c*-3*e*, where the force from an object such as a strike plate is represented by an arrow F against the first surface 12. The resulting movement of the bolt body 11 will now be described with reference to FIG. 3*c*-3*c*.

As already stated above, FIG. 3*b* discloses a position of the bolt body 11 where no forces are applied to the bolt body 11 apart from the biasing force from the biasing device 41 that urges the bolt body 11 towards the extended position.

In FIG. 3*c*, the force F is applied, typically by a person releasing the door so that the extended bolt body 11 is brought into contact with the strike plate of the door frame. Since the bolt body 11 is not blocked by the catch 22, the force F causes the bolt body to be pushed downwards in FIG. 3*c* so that the second surface 13 is pushed against an edge 33 of the opening 31 in the faceplate 30. The second surface 13 is curved, so the force F on the first surface 12 then causes the bolt body 11 to rotate in a counterclockwise direction in FIG. 3*c* and the protruding element 17 is brought into contact with the faceplate 30 so that a fulcrum f is formed between the faceplate 30 and the protruding element 17.

FIG. 3*c* shows a first stage of rotation where only a small rotation has taken place to bring the protruding element 17 into contact with the faceplate 30. In FIG. 3*d*, a second stage of rotation is reached where the bolt body 11 continues it counterclockwise rotation and the second surface 13 slides against the edge 33 of the opening 31. By the fulcrum f being formed between the protruding element 17 and the faceplate 30, the movement of the bolt body 11 is guided to form a desired rotation as shown in this figure.

Also, the rotation of the bolt body 11 causes the first catch 22 to move upwards from the blocking position to rest on top of the second end 11B of the bolt body 11. This is possible since the control member 21 is not acting to keep the first catch 22 in place in the blocking position, and also since the first blocking surface 14 is shaped to allow the first catch 22 to move upwards due to the rotation of the bolt body 11. As mentioned above, one advantageous way of achieving this is to have a substantially spherical first catch 22 and a first blocking surface 14 that has a height of less than half the diameter of the first catch 22, since this combination allows the first catch 22 to move out of the blocking position as the bolt body 11 pivots without risking the first catch 22 getting stuck in the blocking position.

FIG. 3*e* discloses a fully rotated position where the continuous application of the force F has caused the bolt body 11 to rotate to an end position where further rotation is not possible. In this position, the first surface 12 is held at an angle to the faceplate 30, said angle suitably being in a range of 10-80 degrees, more preferably in a range of 30-60 degrees and even more preferably in a range of 40-50 degrees. This alignment of the first surface 12 causes a continued application of the force F to push the bolt body 11 into the locking device 1 in a linear movement to reach a retracted position where the door can be closed by the latch bolt 10 being able to pass the strike plate. In this embodiment, the second surface 13 has a curved portion 13A but in some embodiments the entire second surface 13 could instead be curved.

As can be seen in FIG. 3*b*-3*e*, the rotation of the bolt body 11 also causes a retraction of the bolt body 11 into the locking device 1 by the pin 43 moving into the locking device during the rotation. In this way, the retraction itself starts before the fully rotated position of FIG. 3*e* is reached, but in some embodiments the pin 43 could be placed closer to the fulcrum f so that the retraction is largely avoided until the bolt body 11 is in the fully rotated position. However, in other embodiments the pin 43 could instead be placed even further from the fulcrum f to cause the retraction to proceed further before the fully rotated position is reached.

In the fully rotated position of FIG. 3*e*, the protruding element 17 lies against the faceplate 30 and the control arm 42 is retracted further into the locking device 1. It is to be noted that the control arm 42 in this embodiment does not rotate but instead moves only in a linear path from the extended position of FIG. 3*a*-3*b* to the position shown in FIG. 3*e*. In other embodiments, the control arm 42 could instead move along a non-linear or curved path if desired.

In the second embodiment of FIG. 3*a*-3*e* and also in the first embodiment of FIG. 1-2*c*, the protruding element 17 is a screw that is inserted into the bolt body by an outer thread of the screw mating with an inner thread of a hole 18 in the bolt body. This is advantageous in creating a strong and secure mounting of the protruding element 17 and allows for a removal and re-insertion of the screw as desired. This will be described in more detail below.

In some embodiments, the protruding element 17 could instead be a pin that is inserted into a hole in the bolt body 11, or alternatively the protruding element 17 could be another object that is fixed to the bolt body 11 or it could be integrated with the bolt body 11 as such. Also, in some embodiments the protruding element 17 could be made from the same material as the bolt body 11 whereas in other embodiments the protruding element 17 could be made from another material. It is advantageous to provide the protruding element as a strong part of the bolt body 11 so that damage or breakage is avoided even with repeated use of the locking device 1 over time. For this purpose, it may be advantageous to provide the protruding element 17 as stronger than the bolt body 11 itself, and in particular to avoid wear and tear at the fulcrum f where the protruding element 17 contacts the faceplate 30.

In the second embodiment, the protruding element 17 contacts the faceplate 30 directly to form the fulcrum f, but it is to be noted that there may in some embodiments be intermediate objects so that the fulcrum f is formed either between the protruding element 17 and such an intermediate object that is located beside the faceplate 30, or so that the fulcrum f is formed between the faceplate 30 and such an intermediate object that rotates together with the protruding element 17. Alternatively, the fulcrum may be formed between two intermediate objects so that one of said objects is arranged in connection with the faceplate 30 and the other is configured to rotate together with the protruding element 17.

The locking device 1 as a whole will now be described with reference to FIG. 4*a* onwards. Since locking devices in general and their operation are well known within the art, components and functions of the locking device 1 will mainly be described where they are important for understanding the features and the operation of the present invention.

FIG. 4*a*-4*d* disclose the locking device 1 with the latch bolt 10 and an auxiliary bolt 51 according to a third embodiment of the invention. Also shown are the handle mechanism 60 for operating the latch bolt 10 in a mechanical retraction, the cylinder mechanism 70 for also operating the latch bolt 10 in a mechanical retraction, and the non-mechanical mechanism 80 for operating the catch mechanism 20. In some embodiments where the first catch 22 blocks only the rotation of the bolt body 11 and not the retraction, a second catch may be provided for blocking the retraction of the latch bolt. This is not shown in FIG. 4*a*-4*d* but will be described below with reference to another embodiment. The non-mechanical mechanism 80 may be an electrical or electromagnetic mechanism and may be operated by an activation by a key card, tag, button or other known activation means.

The operation of the catch mechanism 20 and of each of the handle mechanism 60, cylinder mechanism 70 and non-mechanical mechanism 80 will now be described in more detail with reference to FIG. 4*a*-4*b* that disclose a blocked state of the first catch 22 and to FIG. 4*c*-4*d* that disclose a non-blocked state of the first catch 22.

FIG. 4*a*-4*b* disclose the locking device 1 from a first side and from a third side that is opposite to the first side in order to show components of the locking device 1 more clearly. Thus, FIG. 4*a*-4*b* disclose the handle mechanism 60 with a handle follower 61 that is pivoted by moving a handle (not shown) in order to transfer a rotary movement to a handle receiver 62. The handle follower 61 extends to and cooperates with a cylinder follower 71 in such a way that a pivoting of the handle follower in a direction that is clockwise in FIG. 4*a* causes a corresponding pivoting of the cylinder follower 71. The cylinder follower 71 is also connected to a cylinder 72 in order to be pivoted also by a rotation of the cylinder 72 in response to an activation by inserting and rotating a key or similar (not shown). Thus, the cylinder follower 71 may be pivoted by either the rotation of the cylinder 72 or the rotation of the handle receiver 62, and the pivoting of the cylinder follower 71 is transferred to an extension 45 on a first arm 44 that is connected to or integrated with the control arm 42 of the latch bolt 10. Thus, the pivoting of the cylinder follower 71 in the counter-clockwise direction in FIG. 4*a* causes a retraction of the latch bolt 10 to a retracted position if the first catch 22 is not engaged to block the movement.

The first catch 22 is operated by the control member 21 of the catch mechanism 20 pushing against the catch 22 to hold it in the blocking position as shown in FIG. 4*a* and particularly in FIG. 4*b*. As already stated above, the embodiment of FIG. 4*a*-4*d* is an embodiment where the bolt body 11 comprises both the first blocking surface 14 for blocking the rotation of the bolt body 11 and the second blocking surface 15 for blocking the retraction of the bolt body 11. The control member 21 in this embodiment also houses an inner control arm 23 that is operated towards the blocking position of the first catch 22 by a second arm 83 first moving the inner control arm 23 towards the faceplate 30 (i.e. towards the right-hand side of FIG. 4*b*) and then pushing on the control member 21 itself to move it towards the first catch 22 for locking it into place in the blocking position. In some embodiments, the inner control arm 23 may operate the first catch 22 directly by an opening in the control member 21 allowing the inner control arm 23 to extend towards the first catch 22, but in other embodiments only the control member 21 itself may contact the first catch 22. There may also be additional components in connection with the catch mechanism 20 that is/are operated by the inner control arm 23 and/or by the control member 21. In the embodiment of FIG. 4*a*-4*d*, the control member 21 has a bevelled surface 25 that serves to push the first catch 22 firmly into place, but in other embodiments the control member 21 may instead have another shape. Also, in some embodiments there may be intermediate objects that are arranged between the control member 21 and the first catch 22.

The second arm 83 is operated by the non-mechanical mechanism 80, where an actuator 84 that may comprise e.g. an electrical motor or a solenoid causes a movement of an activation arm 81 when activated. The activation arm 81 is in this embodiment coupled to the second arm 83 via a pivotable control plate 82 but in other embodiments the connection may be embodied in other ways. Thus, activation of the activation arm by the actuator 84 causes the blocking mechanism 20 to move the control member 21 so that the first catch 22 is either secured in the blocking position of FIG. 4*a*-4*b* or released from the blocking position so that the latch bolt 10 is allowed to rotate and to be retracted.

The auxiliary bolt 51 is connected to or integrated with an auxiliary control arm 52 that is operable by the handle follower 61 or alternatively by the cylinder follower 71 or any other part of the locking device 1 for retracting the auxiliary bolt 51.

Also provided may be a link 53 that serves to block retraction of the latch bolt 10 when the auxiliary bolt 51 is extended. Typically, this is in situations where the door is open so that both the latch bolt 10 and the auxiliary bolt 51 are fully extended. In situations where the door is closed, the latch bolt 10 will typically fit into a receiving opening on the strike plate and the auxiliary bolt 51 will be held in a retracted position by the strike plate (see FIG. 5*a* where the auxiliary bolt 51 is shown in the retracted position). Typically, the auxiliary bolt 51 is biased towards the extended position by an auxiliary bolt spring 54

FIG. 4*c*-4*d* disclose the same embodiment as FIG. 4*a*-4*b* but with the first catch 22 in the unblocked position so that rotation of the bolt body 11 is allowed. The control member 21 is not in a position where the first catch 22 is held firmly in place in the blocking position against the first blocking surface 14 an the second blocking surface 15, and this causes the first catch 22 to move upwards in FIG. 3*c*-3*d* in the event that the rotation of the bolt body 11 is performed, thus rendering the bolt body 11 pivotable while at the same time keeping the first catch 22 in place for returning to the blocking position when desired.

Also shown in FIG. 4*d* and to some extent in FIG. 4*b* is a third catch 24 that may be provided in the blocking mechanism 20 for blocking movement of the control member 21 in relation to the first catch 22. The third catch 24 is held inside the control member 21 and is configured to be pushed out of an upper opening of the control member 21 by the inner control arm 23 operated by the second arm 83. It is to be noted that the third catch 24 is not necessary for the operation of the present invention but merely represents one option of adding further components and functions to the locking device 1.

FIG. 5*a*-5*e* disclose a fourth embodiment of the invention that differs from the third embodiment described above mainly in the blocking mechanism 20 being operable not only by the non-mechanical mechanism 80 but also by mechanical activation. Similar to the third embodiment, the latch bolt 10 comprises both the first blocking surface 14 and the second blocking surface 15 as in the first embodiment described above. In the following, aspects of the fourth embodiment that are not explicitly described as differing are similar or identical to other embodiments described herein.

Thus, FIG. 5*a* discloses the locking device 1 in a closed position where the latch bolt 10 extends into a strike plate opening 310 in the strike plate 300. The auxiliary bolt 51 is retracted due to its interaction with the strike plate 300 that in particular lacks any opening opposite to the auxiliary bolt 51 to ensure the retracted state of this bolt in the closed position. The handle mechanism 60 operates the handle follower 61 and the cylinder mechanism 70 operates the cylinder follower 71 in the manner described above, and the non-mechanical mechanism 80 also serves to operate the catch mechanism 20 as disclosed above to ensure that the first catch 22 can be held in the blocking position by the control member 21. In FIG. 4*a*, the latch bolt 10 is blocked so that both pivoting and retraction is prevented.

The auxiliary control arm 52 is configured to operate the link 53 by a protrusion 55 contacting the link 53 to cause a pivoting of the link 53 when the auxiliary bolt 51 is released by the strike plate 300 and allowed to extend to the extended position as shown in FIG. 5*b*. The link 53 is in the fourth embodiment connected to the second arm 83 by means of the control plate 82 so that pivoting of the link 53 can operate the control member 21 by means of said second arm 83. In the closed position as shown in FIG. 5*a*, the actuator 84 operates the blocking mechanism 20 to reach the blocking position.

FIG. 5*b* discloses an open position where the latch bolt 10 as well as the auxiliary bolt 51 are in the extended position. In this position, the biasing force provided by the auxiliary spring 54 is able to push the auxiliary bolt 51 to the fully extended position and to pivot the link 53 that in turn operates the blocking mechanism 20 to release the first catch 22 so that the bolt body 11 is able to pivot if subjected to a force on the first surface 12. In FIG. 5*b*, the first catch 22 is still shown in place on the bolt body 11 but if a pivoting were to take place the first catch 22 could be pushed upwards in FIG. 5*b* to prevent interference with the pivoting of the bolt body 11. The auxiliary spring 54 has a spring force that is larger than a force generated by the non-mechanical mechanism 80 (such as a solenoid or electrical motor) so the operation of the link 53 and the extension of the auxiliary bolt 51 takes place regardless of any activation of the actuator 84.

FIG. 5*c* discloses an enlarged view of the link 53 and the auxiliary control arm 52 together with the control plate 82 in the position shown in FIG. 5*b*.

FIG. 5*d* discloses the locking device 1 in the closed position similar to FIG. 5*a*, but with the first catch 22 removed from the position adjacent to the first blocking surface 14 by the control member 21 being retracted by the second arm 83. This is achieved by either the handle mechanism 60 or the cylinder mechanism 70 being operated to retract the latch bolt 10 by acting on the extension 45 of the first arm 44 connected to the control arm 42 and also to unblock the first catch 22 by operating the link 53. The latch bolt 10 is thus able to both be rotated and retracted. FIG. 5*e* discloses the link 53 and surrounding components in more detail in the same position as in FIG. 5*d*.

It is highly advantageous that the latch bolt 10 may be allowed to both rotate and retract when in the open position as shown in FIG. 5*b*, since this fulfils fire safety standards by enabling the door to close in the event of a fire. The door moving towards the strike plate then causes the rotation of the bolt body 11 as described above and also leads to the retraction of the latch bolt 10 when the fully rotated position has been reached. In the fourth embodiment of FIG. 5*a*-5*e* this is achieved by the auxiliary bolt 51 operating the blocking mechanism 20 so that the first catch 22 is always unblocked when the auxiliary bolt 51 is extended. In other embodiments it may be achieved in other ways.

Another advantage of the present invention will now be described in more detail with reference to FIG. 6*a*-6*d*, namely the feature of removing the bolt body 11 and replacing it without requiring opening of the locking device 1 itself. This feature may be achieved in any embodiment disclosed herein as long as the protruding element 17 is removably attached to the bolt body 11.

FIG. 6*a* discloses the components of the locking device 1 in a non-blocking state where the non-mechanical mechanism 80 has been used to retract the control member 21 so that the first catch 22 is allowed to move. FIG. 6*b* discloses the locking device 1 with a housing 90 in which the components of FIG. 6*a* are mounted, and where access to the handle mechanism 60 and the cylinder mechanism 70 is provided by corresponding openings in the housing 90. In particular, the housing 90 comprises a first access opening 91 through which the protruding element 17 is visible. In this embodiment, the protruding element 17 is a screw that is screwed into an opening in the bolt body 11 as described in detail above, but other options are also possible as long as the protruding element 17 is removable from the bolt body 11.

It is particularly advantageous to remove and replace the bolt body 11 in situations where the locking device 1 is to be mounted in a door that opens to the right or to the left. If the bolt body 11 is not removable and replaceable, it would not be possible to use the same locking device 1 for both situations since the bolt body 11 is only configured to rotate in one direction when subjected to a force from the strike plate 300 as described above. For this reason, it is highly beneficial to be able to turn the bolt body 11 to enable rotation in a desired direction.

The bolt body 11 in the embodiment of FIG. 6*a*-6*d* comprises the first blocking surface 14 and the second blocking surface 15 as described above in connection with the first embodiment and others, and in particular the bolt body 11 also comprises a third blocking surface 16 and a fourth blocking surface 17 on a lower part of the bolt body 11. Suitably, the bolt body 11 has mirror symmetry about a symmetry axis A that extends substantially horizontal when the bolt body 11 is mounted in the locking device 1 as in FIG. 6*b*. In this way, the third blocking surface 16 will be able to perform the function of the first blocking surface 14 if the bolt body 11 is turned upside down. Also, the fourth blocking surface 17 will be able to perform the function of the second blocking surface 16 when the bolt body 11 is turned upside down and inserted into the locking device 1.

FIG. 6*c* discloses an enlarged view of the circle in FIG. 6*b*, showing how the screw 17 may be unscrewed from the bolt body 11 by using a tool such as a screwdriver inserted through the first access opening 91. Once the screw 17 is removed, the bolt body 11 may be removed from the locking device 1 through the opening in the faceplate 30. The bolt body 11 may then be rotated as shown by an arrow in FIG. 6*d* so that the third and fourth blocking surfaces 16, 17 face upwards before the bolt body 11 is again inserted into the locking device 1 through the opening in the faceplate 42. In some embodiments, the control arm 42 may also be removed together with the bolt body 11, but in other embodiments the control arm 42 may remain inside the locking device 1 so that the bolt body 11 is reattached to the control arm 42 when it is reinserted again.

Suitably, there is a second access opening on the opposite side of the locking device 1 so that the screw may be reattached into the opening 18 after the bolt body 11 is replaced. The second access opening is not shown in the figures but is suitably similar or identical to the first access opening 91, or is at least located in a suitable position on the housing 90 so that access to the screw 17 from the opposite side of the locking device 1 is created.

Once the bolt body 11 is replaced and the protruding element 17 is reattached, the locking device 1 is ready for use and differs from its state before turning the bolt body 11 mainly in the bolt body 11 being able to pivot in the opposite rotational direction. Other functions and components of the locking device 1 are in general not altered by the turning of the bolt body 11.

It is in particular to be noted that the bolt body 11 in embodiments where the bolt body 11 is turnable in this way may comprise only the first blocking surface 14 and the third blocking surface 16 so that only the rotation of the bolt body 11 is blocked by the first catch 22.

It is advantageous that the first catch 22 is held in the blocking position in a center of the bolt body 11, i.e. near a center axis of the bolt body 11 extending from the second end 11B to the first end 11A (see axis B in FIG. 2*a*). This has the benefit that forces are distributed in substantially the same way regardless of which end of the bolt body 11 is turned up towards the first catch 22.

FIG. 7*a*-7*c* disclose a fifth embodiment where the locking device 1 comprises the first catch 22 for blocking rotation of the bolt body 11 and where the locking device 1 also comprises a second catch 26 for blocking retraction of the latch bolt 10. The bolt body 11 thus comprises the first blocking surface 14 but not the second blocking surface 15 (see FIG. 2*a* above that discloses a bolt body 11 of this type). In other respects, the fifth embodiment is similar to the other embodiments described herein.

In FIG. 7*a*, the locking device 1 is in the open position where both the latch bolt 10 and the auxiliary bolt 51 are extended. The second catch 26 is configured with a bolt blocking surface 27 that may contact the extension 45 of the control arm 42 in a blocking position. In this embodiment, the extension 45 of the control arm 42 forms a retraction blocking surface that the second catch 26 blocks for preventing retraction of the latch bolt 10. The retraction blocking surface may be arranged on the control arm 42, on the bolt body 11 or in connection with either of these, i.e. with at least one intermediate component between the retraction blocking surface and the control arm 42 or the bolt body 11.

FIG. 7*a* discloses a state where the second catch 26 is in a non-blocking position where the bolt body 11 and the control arm 42 may freely move in a linear direction to the right in the Figure. The second catch 26 is brought to this position by the extension of the auxiliary bolt 51 operating the link 53 to rotate the second catch 26 and release the extension 45, but in other embodiments of the invention the second catch 26 may alternatively be operated in another way by another mechanism of the locking device 1. The first catch 22 is in the blocking position held in place by the control member 21, so that rotation of the bolt body 11 is prevented. In this position, the locking bolt 1 may be operated by engaging the handle mechanism 60 or the cylinder mechanism 70 for retracting the latch bolt 10, but rotation of the bolt body 11 is prevented so the door will not automatically close if the bolt body 11 is pushed towards the strike plate.

In FIG. 7*b*, the locking device 1 is in the closed position with the latch bolt 10 extended and the auxiliary bolt 51 retracted, typically through contact with the strike plate as described above. The retraction of the auxiliary bolt 51 has caused a pivoting of the link 53 that is in turn transferred to the second catch 26 for pivoting the second catch 26 to the blocking position where the bolt blocking surface 27 facing the retraction blocking surface blocks retraction of the latch bolt 10. The first catch 22 is still in the blocking position so that rotation of the bolt body 11 is prevented. Thus, in the closed state shown in FIG. 7*b*, both rotation and retraction of the latch bolt 10 is blocked.

In FIG. 7*c*, the non-mechanical mechanism 80 is operated to remove both the first catch 22 and the second catch 26 from the blocking position. This is achieved by the actuator 84 operating a second link 85 that causes a pivoting movement in the counter-clockwise direction of the second catch 26 and by the actuator 84 operating the second arm 83 in order to release the first catch 22 as described above in other embodiments. It is highly advantageous that the non-mechanical mechanism 80 is configured to operate both the first catch 22 and the second catch 26 so that both rotation and retraction of the latch bolt 10 is enabled.

FIG. 8 discloses a sixth embodiment with a double latch bolt 11, 11' that enables rotation of one bolt body 11 in one direction and another bolt body 11' in the other direction. The double latch bolt 10' allows for a door to be both opened and closed by pulling or pushing the double latch bolt 10' against the strike plate as long as rotation is not blocked by the first catch 22. One of the bolt bodies 11 is then able to rotate if the latch bolt 10 is pushed against the strike plate in a closing motion and the other bolt body 11' is able to rotate when pushed against the strike plate in an opening motion. In some embodiments, a third catch (not shown) may be provided in order to block rotation of the other of bolt bodies 11', but in some embodiments only the first catch 22 may be used so that rotation of the other bolt body 11' is always allowed.

FIG. 9 discloses a seventh embodiment of the locking device where the first catch 22 is in the form of a catch body 223 arranged on a plunger 224. This is to show an alternative to the spherical first catch 22 as shown above in connection with other embodiments, and it is in particular to be noted that the first catch 22 could alternatively also have other shapes.

In the seventh embodiment, the first catch 22 thus comprises the catch body 223 and the plunger 224 that may be mounted in the locking device as desired. The plunger 224 is arranged in connection with a catch spring 56 that biases the catch body 223 towards the latch bolt 10 to ensure that it is able to contact the first blocking surface 14 and optionally also the second blocking surface 15. The control member 21 acts to push the catch body 223 into the blocking position by pressing against a tapering upper part 222 to encourage the catch body 223 to reach its blocking position and be held there securely. Similarly, a tapering lower part 221 is provided on the catch body 223 so that a rotation of the bolt body 11 causes a movement upwards away from the blocking position in situations where the control member 21 is not pushing the catch body 223 downwards.

It would also be possible to use the catch body 223 without the plunger 224 and allow it to fall down towards the latch bolt 10 by gravitation.

Thus, the advantages described above in relation to the first catch 22 having a spherical shape are also achieved by the catch body 223 of the first catch 22 of FIG. 9. These advantages include being removable from the blocking position by rotation of the bolt body 11 when the control member 21 is not fixing the first catch 22 in place. They also include the control member 21 being able to move the catch body 223 down into the blocking position and holding it there securely. Furthermore, the catch body 223 may move down towards the bolt body 11 by gravity but the catch spring 56 on the plunger 224 may also act to bias the first catch 22 towards the blocking position to ensure that the first catch 22 properly placed to be blocked by the control member 21. It is to be noted that the embodiments described above may be varied within the scope of the present invention. In particular, when it is stated that components are operatively connected to each other or affect each other in some way, this is to be understood as including both the option that they act on each other directly and the option that there is at least one intermediary component that transfers the force or contact from one component to the other.

It is also in particular to be noted that features from the various embodiments described herein may freely be combined, unless it is explicitly stated that such a combination would be unsuitable.

The invention claimed is:

1. A locking device comprising an elongated face plate (30) for mounting on a door, the face plate comprising an opening (31) for a latch bolt, a latch bolt (10) having a bolt body (11) with a first end (11A) and a second end (11B), the bolt body (11) comprising a first surface (12) and a second surface (13) on opposite sides of the first end (11A), the latch bolt (10) configured to move from an extended position with the first end (11A) protruding from the opening (31) in the face plate (30) to a retracted position, the bolt body (11) configured to rotate around an axis parallel to the face plate (30) in response to a force applied to the first surface (12), and the second surface (13) curved for sliding along an edge (33) of the opening (31) in the face plate (30) during rotation of the bolt body (11), a first blocking surface (14) on the second end (11B) of the latch bolt (10), and a first catch (22) movable to a blocking position in which the first catch (22) engages the first blocking surface (14) for preventing the rotation of the bolt body (11), further comprising a protruding element (17) removably fastened to the bolt body (11) between the first end (11A) and the second end (11B) and adjacent to the face plate (30) in the extended position, the protruding element (17) configured to cooperate with the face plate (30) to form a fulcrum for rotating the bolt body (11) in a first rotational direction in response to force applied to the first end (11A).

2. The locking device according to claim 1, wherein the second end (11B) of the bolt body (11) comprises a second blocking surface (15), and the first catch (22) is configured to engage the second blocking surface (15) in the blocking position for preventing movement of the latch bolt (11) to the retracted position.

3. The locking device according to claim 1, further comprising a control arm (42) for operating the latch bolt (10) in a retraction direction and extension direction, and comprising a retraction blocking surface arranged in connection with the bolt body (11) or the control arm (42), wherein the locking device comprises a second catch (26) configured to engage the retraction blocking surface for preventing movement of the latch bolt (11) to the retracted position.

4. The locking device according to claim 3, further comprising a solenoid, electric motor, micro switch, or actuator (80) for operating the locking device (1) in response to a non-mechanical activation, wherein the solenoid, electric motor, micro switch, or actuator (80) is configured to operate a control mechanism (20), and the solenoid, electric motor, micro switch, or actuator (80) is operatively connected to the second catch (26).

5. The locking device according to claim 1, wherein the first catch (22) is substantially spherical.

6. The locking device according to claim 1, wherein the first catch (22) has a tapering lower part (221) and the first blocking surface (14) and optionally also a second blocking surface (15) has a height less than half height of the tapering lower part (221).

7. The locking device according to claim 1, wherein the locking device (1) further comprises a control mechanism (20) for preventing movement of the first catch (22) out of the blocking position in an engaged state.

8. The locking device according to claim 7, further comprising a solenoid, electric motor, micro switch, or actuator (80) for operating the locking device (1) in response to a non-mechanical activation, wherein the solenoid, electric motor, micro switch, or actuator (80) is configured to operate the control mechanism (20).

9. The locking device according to claim 1, wherein the blocking position of the first catch (22) is a position in which the first catch (22) is held in a center position of the second end (11B) of the latch bolt (11).

10. The locking device according to claim 1, wherein the first blocking surface (14) and optionally a second blocking surface (15) is/are on an upper part of the latch bolt (10) so that movement of the first catch (22) to the blocking position is directed at least partially downwards.

11. The locking device according to claim 10, wherein the latch bolt (10) comprises a third blocking surface, said third blocking surface configured to prevent a rotation of the latch bolt (10).

12. The locking device according to claim 1, further comprising a housing (90) for holding the latch bolt (10), wherein the housing (90) comprises a first access opening for providing access to the protruding element (17) when the latch bolt (10) is in the extended position such that the protruding element (17) can be removed from the locking device through the first access opening.

13. The locking device according to claim 1, wherein the protruding element (17) is fixedly attached to or integrally formed with the latch bolt (10).

14. The locking device according to claim 1, wherein the protruding element (17) is a screw with an outer thread and the protruding element (17) is removably fastened to the bolt body (11) by the screw being screwed into a hole with an inner thread in the bolt body (11).

15. The locking device according to claim 1, wherein the protruding element (17) is a pin, and the protruding element (17) is removably fastened to the bolt body (11) by the pin being inserted into a corresponding opening in the bolt body (17).

16. The locking device according to claim 1, wherein the opening in the face plate is dimensioned to allow extraction of the bolt body (11) through the opening when the protruding element (17) is removed.

17. The locking device according to claim 1, wherein the protruding element (17) is configured to cooperate with the face plate (30) by the protruding element (17) contacting the face plate (30), optionally with at least one intermediate element between the protruding element (17) and the face plate (30).

18. The locking device according to claim 1, wherein a housing (90) comprises a second access opening on an opposite side to the first access opening for providing access to an opposite side of the latch bolt (10).

19. The locking device according to claim 1, wherein a control arm (42) is removably engaged to the latch bolt (10).

* * * * *